United States Patent
Marti et al.

(10) Patent No.: US 9,807,561 B2
(45) Date of Patent: Oct. 31, 2017

(54) USER SETTLEMENT DETECTION

(71) Applicant: Apple Inc., Cupertino, CA (US)

(72) Inventors: Lukas M. Marti, Santa Clara, CA (US); Michael P. Dal Santo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,635

(22) Filed: Jun. 5, 2015

(65) Prior Publication Data
US 2016/0360368 A1 Dec. 8, 2016

(51) Int. Cl.
*H04W 4/02* (2009.01)
*H04W 84/12* (2009.01)
*H04W 84/10* (2009.01)

(52) U.S. Cl.
CPC .......... *H04W 4/025* (2013.01); *H04W 4/021* (2013.01); *H04W 84/10* (2013.01); *H04W 84/12* (2013.01)

(58) Field of Classification Search
CPC ... H04W 72/085; H04W 88/08; H04W 4/021; H04W 24/08; H04W 48/12
See application file for complete search history.

(56) References Cited

U.S. PATENT DOCUMENTS

| | | | |
|---|---|---|---|
| 6,850,734 B1 * | 2/2005 | Bruno | G01C 21/206 455/456.1 |
| 7,620,394 B2 * | 11/2009 | Good | H04B 7/18563 340/10.1 |
| 7,768,963 B2 * | 8/2010 | Alizadeh-Shabdiz | G01S 5/02 342/109 |
| 8,386,008 B2 | 2/2013 | Yuen et al. | |
| 8,941,478 B2 | 1/2015 | Mirle et al. | |
| 2004/0243664 A1 * | 12/2004 | Horstemeyer | B60R 25/102 709/200 |
| 2006/0079243 A1 * | 4/2006 | Bates | H04M 1/72572 455/456.1 |
| 2009/0292597 A1 * | 11/2009 | Schwartz | G06Q 10/10 705/13 |
| 2013/0166201 A1 | 6/2013 | Paim et al. | |
| 2013/0295954 A1 * | 11/2013 | Hamalainen | G01S 5/0289 455/456.1 |
| 2014/0365119 A1 | 12/2014 | Haverinen et al. | |
| 2015/0106448 A1 | 4/2015 | Ownbey et al. | |
| 2015/0181384 A1 * | 6/2015 | Mayor | H04W 24/02 455/456.1 |
| 2015/0223023 A1 * | 8/2015 | Das | H04W 4/021 455/457 |

* cited by examiner

*Primary Examiner* — Nizar Sivji
(74) *Attorney, Agent, or Firm* — Fish & Richardson P.C.

(57) ABSTRACT

Methods, systems and computer program products for user settlement detection are disclosed. A mobile device configured to perform an action immediately upon entering or exiting a geofenced environment can delay performing the action until a user of the mobile device has settled into the environment. The mobile device can detect a settled user state by observing the environment of the mobile device, including measuring one or more environment variables using one or more sensors of the mobile device. The mobile device can detect a settled user state even when the mobile device is in motion. The mobile device can perform the action upon detecting a settled user state.

21 Claims, 7 Drawing Sheets

USER SETTLEMENT DETECTION

TECHNICAL FIELD

This disclosure relates generally to geofence-based services.

BACKGROUND

Some modern mobile devices can perform various actions when entering or exiting geofenced environments. When a mobile device detects an entrance into or exit from a geofenced environment, an action is triggered. For example, the mobile device can display a notification upon entering a geofenced environment (e.g., an office in a building). The mobile device can determine that the mobile device entered the geofenced environment using various sensors and positioning technologies. Upon determining that the mobile device has entered the geofenced environment, the mobile device can display the notification.

Triggering the action immediately upon entry into or exit from a geofenced environment can be inconvenient to a user. For example, the user may be able to respond to the notification only when the user has settled down (e.g., is sitting at a desk in the office). If the notification were to occur immediately when the user enters or exits the geofenced environment and before the user settles down, the user may be too distracted to see or react to the notification.

SUMMARY

Techniques for user settlement detection are disclosed below. A mobile device configured to perform an action immediately upon entering or exiting a geofenced environment can delay performing the action until a user of the mobile device has settled into the environment. The mobile device can detect a settled user state by observing the environment of the mobile device, including measuring one or more environment variables using one or more sensors of the mobile device. The mobile device can detect a settled user state even when the mobile device is in motion. The mobile device can perform the action upon detecting a settled user state.

The features described in this specification can achieve one or more advantages. For example, compared to a conventional mobile device, a mobile device implementing the techniques described in this specification can perform an action at a moment that is more convenient to a user. The mobile device can avoid presenting unnecessary geofence-based notifications to a user when the user is merely crossing the geofence rather than settling inside the geofenced environment. The mobile device can request the user to interact with the mobile device upon detecting a settled user state indicating that the user is settled and ready to interact with the mobile device. Accordingly, the mobile device can avoid or reduce false notifications (e.g., alarms) related to geofence crossings, thereby providing a better user experience. By implementing the features disclosed in this specification, a mobile device can add context to a geofence, instead of focusing only on latitude and longitude of the geofence. Adding context to a geofence can enhance functions of geofence-based applications.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

Like reference symbols in the various drawings indicate like elements.

DETAILED DESCRIPTION

Exemplary Settlement Detection

Figure 1:
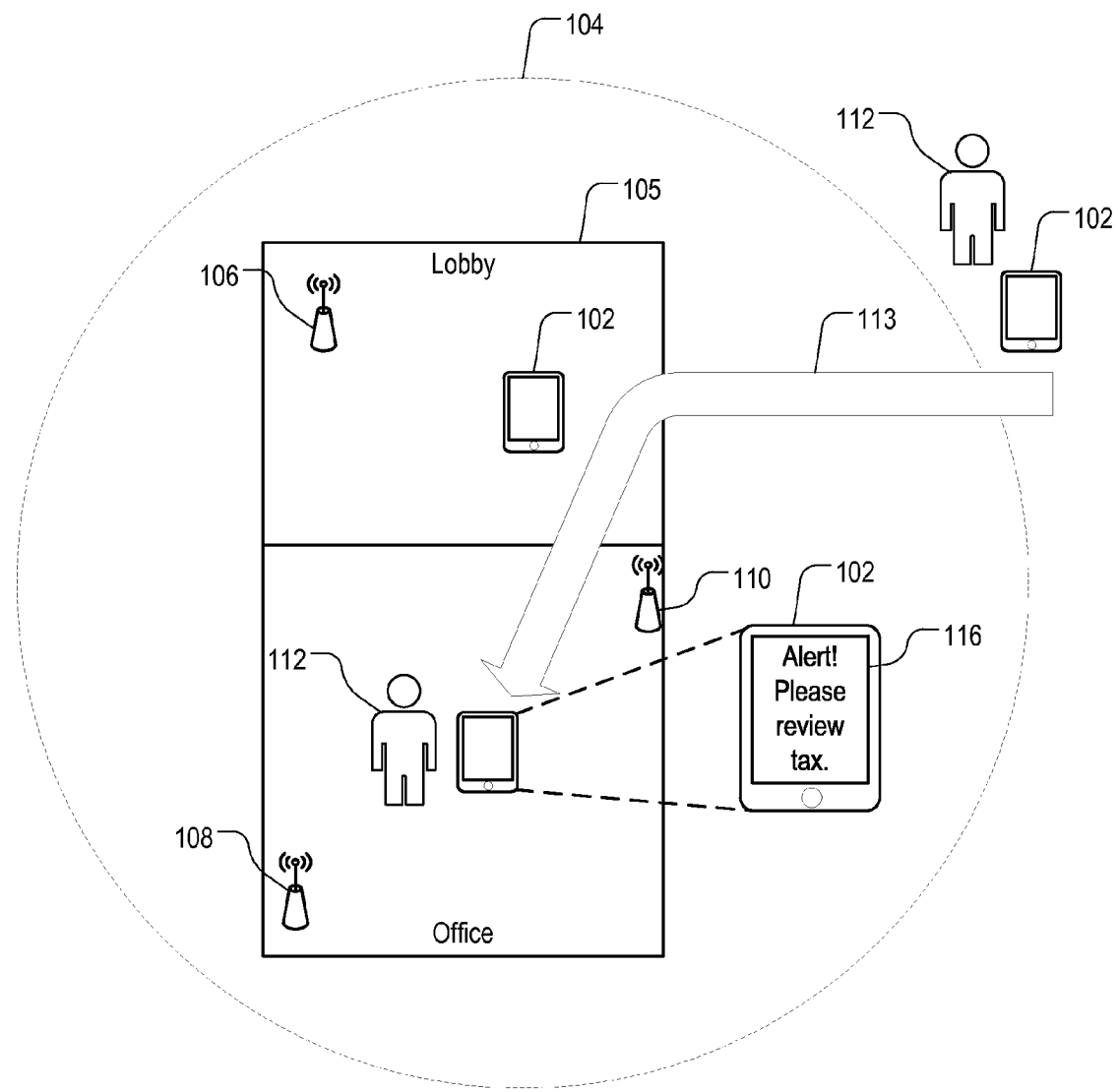
FIG. 1 is a diagram illustrating example user settlement detection.

FIG. 1 is a diagram illustrating example user settlement detection. Mobile device 102 can be a device configured to perform an action upon entering geofenced environment 104. The action can be performing a system function of mobile device 102 or executing an application program of mobile device 102. In the example shown, mobile device 102 is configured to display an alert "Please prepare tax" upon entering geofenced environment 104.

Geofenced environment 104 can be a geographic area (e.g., office building 105) enclosed by a "virtual" fence. Mobile device 102 can determine that mobile device 102 has crossed geofenced environment 104 using various sensors and positioning technologies, for example, by using signals from a global navigation satellite system (GNSS), wireless access points (e.g., Wi-Fi™ access points) or both. Due to variations and limitations of the technologies used, geofenced environment 104 may or may not exactly match a footprint of office building 105.

In the example shown, mobile device 102 is carried into geofenced environment 104 by user 112. Mobile device 102 can determine that mobile device 102 entered geofenced environment 104 by detecting signals from wireless access points 106, 108 and 110. Instead of immediately displaying a notification (e.g., an alert) upon entering geofenced environment 104, mobile device 102 can determine whether user 112 is settled down.

User 112 has settled down when activity of user 112 as determined by measurements of environment variables indicates in a statistical sense that the user 112 is ready to interact with mobile device 102 performing the action. In the example shown, user 112 carries mobile device 102 while walking along path 113, passing a lobby of office building 105 and entering an office of user 112. Walking along path 113 (as indicated by motion sensors and a floorplan) is detected as unsettled. User 112 then sits down in a chair in her office. Sitting down in a chair in her office (as indicated by motion sensors and a floorplan) is detected as settled. Mobile device 102 can determine that user 112 has settled down after user 112 sits in her chair even if mobile device 102 itself is in motion. For example, mobile device 102 can determine that user 112 has settled down even if user 112, after sitting down in the chair, pulls mobile device 102 from a pocket and shakes mobile device 102 or otherwise moves mobile device 102.

Upon determining that user 112 has settled down, mobile device 102 can perform the action, e.g., by displaying the alert on a screen 116 of mobile device 102. Accordingly, mobile device 102 delays performing the action from the time of geofence crossing to the time user 112 has settled down.

Mobile device 102 implementing user settlement detection can determine that user 112 settles down using one or more sensors of mobile device 102 that measure environment variables. The sensors can measure various aspects of wireless signals, ambient sound, air pressure, magnetic fields and motion, among others. Further examples of user settlement detection are described below in reference to FIGS. 2-3.

Figure 2:
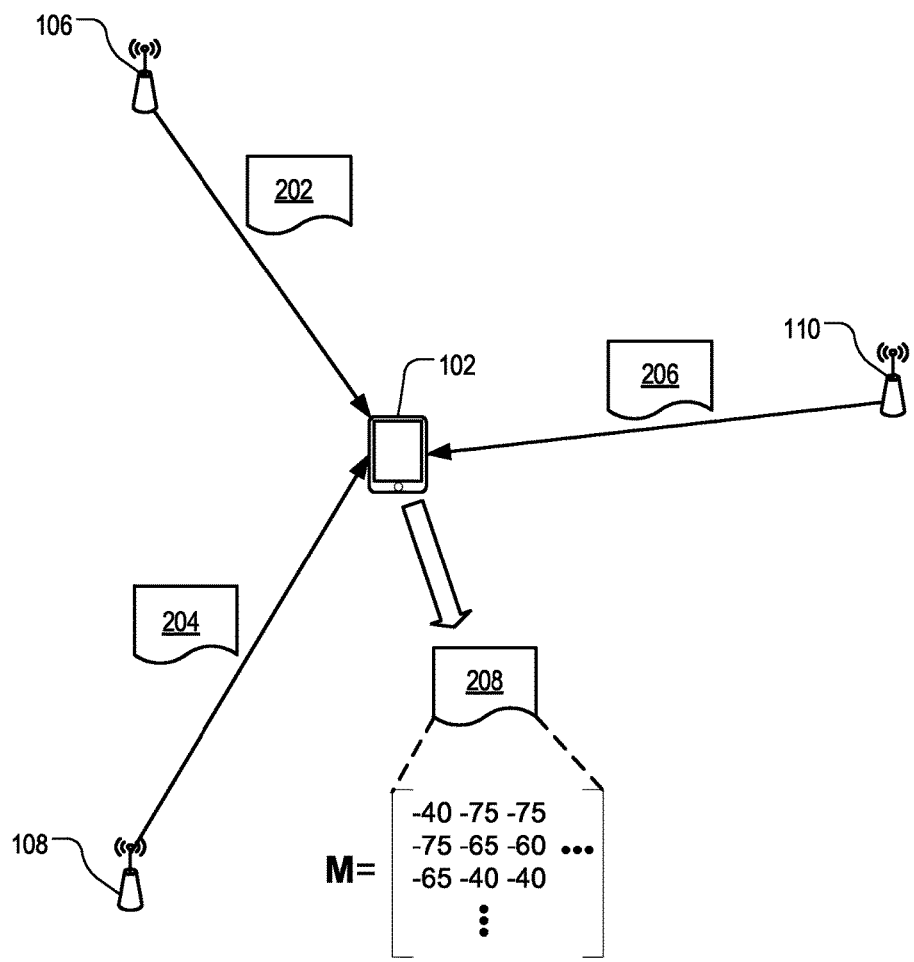
FIG. 2 is a diagram illustrating example user settlement detection using wireless access points.

FIG. 2 is a diagram illustrating example user settlement detection using wireless access points. Mobile device 102 can include a radio frequency (RF) signal receiver. The RF receiver can detect RF signals from wireless access points 106, 108 and 110. The signals can encode respective identifiers 202, 204 and 206 from wireless access points 106, 108 and 110. In some implementations, each of identifiers 202, 204 and 206 can be a media access control (MAC) address of a respective wireless access point.

Mobile device 102 can record readings of the RF receiver. The readings can include measurements of the RF signals. The measurements can include, for example, a respective received signal strength indicator (RSSI) for each signal. Mobile device 102 can record the readings at times k, k+1, k+2 and so on. Time k can be an arbitrary time. Time k+1 can be time k plus a discrete interval (e.g., one second, five second or ten seconds). Mobile device 102 can designate measurements m at time k as observation vector $z_k$. Observation vector $z_k$ can have a number of elements corresponding to a number of wireless access points n detected by the receiver at time k, where each element in the vector $z_k$ is a measurement of a signal from a different wireless access point i. Measurement matrix 208 ($M_{k,i}$) is a q×n matrix that can be constructed from observation vectors $z_k$ as follows:

$$M_{k,i} = \begin{bmatrix} m_{1,1} & m_{1,2} & \cdots & m_{1,n} \\ m_{2,1} & m_{2,2} & \cdots & m_{2,n} \\ \vdots & \vdots & \vdots & \vdots \\ m_{q,1} & m_{q,2} & \cdots & m_{q,n} \end{bmatrix} \quad [1]$$

where the ith wireless access point measurement m is measured at the kth measurement time, i=1, 2, 3 . . . n, k=1, 2, 3 . . . q, n is a positive integer equal to the total number of wireless access points and q is a positive integer equal to the total number of measurement times in a measurement window W. The window W represents the total amount of time it takes for the user to settle down in geofenced environment 104. This matrix may be sparse, for example, when mobile device 102 is in an unsettled state and moves from one location to another, observing different access points.

For example, mobile device 102 may measure access point signals from AP1, AP2 and AP3 at time k, and access point signals AP2, AP3, AP4 and AP5 at time k+1, where each of AP1 through AP5 is an identifier (e.g., MAC address) of a respective access point. Mobile device 102 can assign each distinct access point to a distinct column in measurement matrix 208.

In some implementations, each element of measurement matrix 208 can be signal measurement (e.g., RSSI in dBm) of a corresponding wireless access point at a corresponding time. Mobile device 102 can determine whether user 112 has settled down using measurement matrix 208. In some implementations, mobile device 102 can determine that user 112 has settled down upon determining that the measurements m in measurement matrix 208 satisfy one or more of (1) a deviation threshold, (2) a sparsity threshold or (3) a duty cycle threshold.

Deviation Threshold

In some implementations, mobile device 102 can determine an expected value E[Xi] and standard deviation σi for a measurement of an RF signal transmitted by wireless access point i, where Xi is the measurement (e.g., RSSI in dBm) of wireless access point i. Mobile device 102 can create a vector $[\sigma_{t1} \ldots \sigma_{ti} \ldots \sigma_{tm}]$ of deviation threshold for each wireless access point i. In some implementations, the vector elements $[\sigma_{t1} \ldots \sigma_{ti} \ldots \sigma_{tm}]$ can be pre-specified (e.g., $\sigma_{t1}=\sigma_{ti}=\sigma_{tm}=5$ dBm). In some implementations, mobile device 102 can determine the vector elements $[\sigma_{t1}, \ldots \sigma_{ti}, \ldots \sigma_{tm}]$ by measuring standard deviations of the measurements during a time period p when a motion sensor (e.g., an accelerometer or gyro rate sensor) indicates that mobile device 102 is stationary. Time period p may be the same as or shorter than time window W. Mobile device 102 can calculate deviation thresholds deviations $[\sigma_{t1} \ldots \sigma_{ti} \ldots \sigma_{tm}]$ of the measurements at time period p when the motion sensor indicates that mobile device 102 is stationary. Mobile device 102 can determine that measurement matrix 208 satisfies the deviation threshold upon determining each standard deviation σi for wireless access point i is less than the corresponding deviation threshold for wireless access point i ($\sigma_{ti}$).

Sparsity Threshold

In some implementations, mobile device 102 can determine a sparsity S of measurement matrix 208. Mobile device 102 can determine that the measurement matrix 208 is sparse upon determining that the sparsity S is smaller than a predefined value. The predefined value can be determined by mobile device 102 using a supervised or unsupervised learning scheme. More particularly, mobile device 102 can determine the sparsity S by determining the number of elements of measurement matrix 208 that are null or zero. Mobile device 102 can then determine the sparsity S by dividing the number of null or zero elements by the size of measurement matrix 208, which in Equation [1] is a q×n matrix. Mobile device 102 can designate as null or zero an element in measurement matrix 208 corresponding to wireless access point APi at measurement time k+1 when, for example, the access point APi is detected at measurement time k but not detected at measurement time k+1.

Duty Cycle Threshold

In some implementations, mobile device 102 can determine a respective duty cycle Di for each access point APi (i=1, 2, 3, . . . n) represented in measurement matrix 208. For example, mobile device 102 can obtain a pre-specified or calculated duty cycle threshold (e.g., 80 percent). Mobile device 102 can determine that measurement matrix 208 satisfies the duty cycle threshold if each duty cycle Di is greater than the duty cycle threshold $d_{ti}$. Mobile device 102 can determine the duty cycle Di by dividing the time wireless access point i is detected by the total time. In particular, for example, if mobile device 102 detects a particular access point i m times in the q periods, mobile device 102 can designate the ratio m over q as the duty ratio, as shown below in Equation [2].

$$D_i = \frac{m}{q} > d_{ti} \qquad [2]$$

Figure 3:
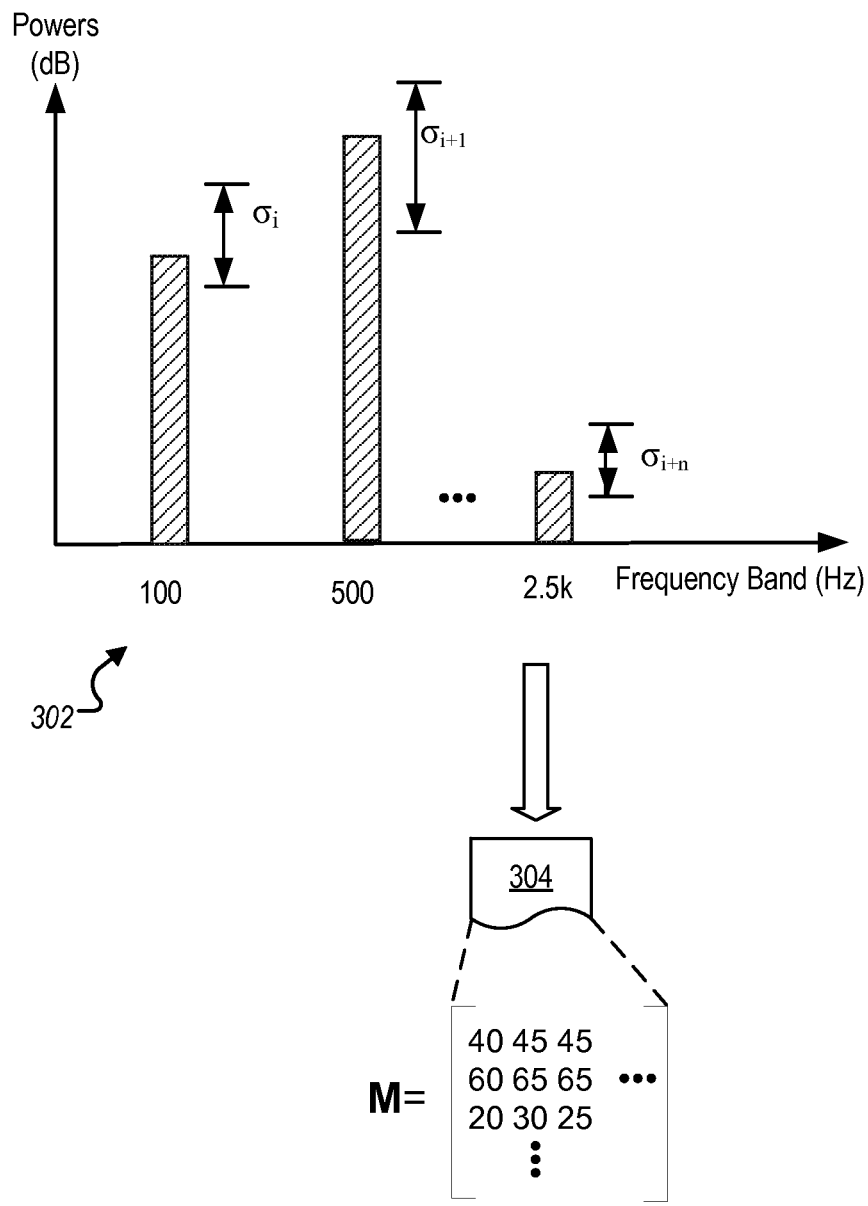
FIG. 3 is a diagram illustrating example user settlement detection using ambient sound.

FIG. 3 is a diagram illustrating example settlement detection using ambient sound. Mobile device 102 can include a microphone. Mobile device 102 can record ambient sound at various times k, k+1, k+2 and so on. Each recording can last a specified time period (e.g., 0.1 seconds). Mobile device 102 can convert the sound to the frequency domain using, for example, a Fast Fourier Transform (FFT) on each recording. Mobile device 102 can determine a respective frequency spectrum 302 for each recording.

Mobile device 102 can determine measurement matrix 304 for the ambient sound measurements. Measurement matrix 304 can have a time dimension including measurement times k, k+1, k+2 and so on. Measurement matrix 304 can have a frequency dimension that corresponds to a list of frequencies, e.g., 100 Hz, 500 Hz, 2.5 k Hz, etc. Each respective ambient sound measurement in frequency Fi at measurement time k can be a power level in decibel (dB).

Mobile device 102 can determine an expected power level E[Pi] and a standard deviation of the power level σi for each frequency Fi. Mobile device 102 can determine that user 112 has settled down when each standard deviation σi satisfies a corresponding sound deviation threshold $\sigma_{ti}$. In some implementations, mobile device 102 can assign each sound deviation threshold $\sigma_{ti}$ using a pre-specified value (e.g., 10 dB). In some implementations, mobile device 102 can determine each sound deviation threshold $\sigma_{ti}$ using standard deviations of measurements recorded by a microphone of the mobile device at a time when a motion sensor of mobile device 102 indicates that mobile device 102 is stationary.

FIGS. 2-3 illustrate settlement detection using RF signals and sound levels. Mobile device 102 can use other sensor readings, e.g., barometer readings, light sensor readings, hygrometer readings or thermometer readings to determine whether user 112 has settled down in a similar manner. In some implementations, mobile device 102 can determine whether user 112 has settled down using weighted voting of the threshold calculations from various sensor readings.

Exemplary Device Components

Figure 4:
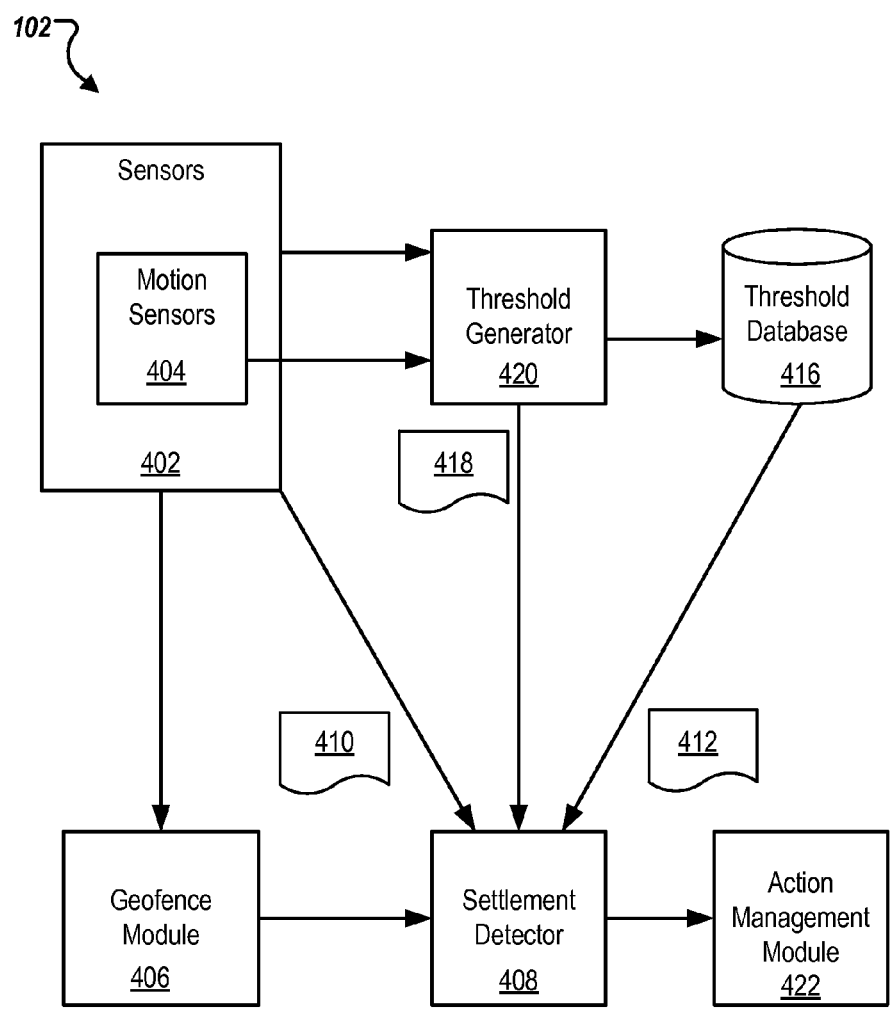
FIG. 4 is a block diagram illustrating components of an example mobile device configured to implement user settlement detection.

FIG. 4 is a block diagram illustrating components of example mobile device 102 configured to detect user settlement. Mobile device 102 can include, or couple to, sensors 402. Sensors 402 can include, for example, one or more RF receivers, microphones, barometers, light sensors, thermometers, hygrometers. In particular, sensors 402 can include one or more motion sensors 404. Motion sensors 404 can include, for example, one or more gyroscopes, accelerometers or magnetometers.

Mobile device 102 can include geofence module 406. Geofence module 406 is a component of mobile device 102 configured to determine whether mobile device 102 entered a geofenced environment (e.g., geofenced environment 104) for performing an action using readings from sensors 402. Upon determining that mobile device 102 entered the geofenced environment, geofence module 406 can send a notification to settlement decider 408 requesting settlement decider 408 to decide whether user 112 of mobile device 102 has settled down.

Upon receiving the notification, settlement decider 408 can obtain sensor readings 410 from sensors 402 over a time period. Settlement decider 408 can generate one or more measurement matrices (e.g., measurement matrix 208, measurement matrix 304 or both) from sensor readings 410. Settlement decider 408 can obtain pre-specified thresholds 412 from threshold database 416. Alternatively or additionally, settlement decider 408 can obtain learned thresholds 418 from threshold generator 420. Threshold database 416 can be a data store on mobile device 102 or located remote from mobile device 102 storing pre-specified thresholds 412. Pre-specified thresholds 412 can include sparsity thresholds, deviation thresholds, duty cycle thresholds or any combination of the above.

Threshold generator 420 can be a component of mobile device 102 configured to determine one or more learned thresholds 418 from readings of sensors 402. In particular, threshold generator 420 can determine deviation thresholds of sensor measurements when motion sensor 404 indicates that mobile device 102 is stationary. Threshold generator 420 can then designate those deviation thresholds as learned thresholds 418. Determining the deviation thresholds of sensor measurements can take place in a time period that is shorter than the time window for determining that user 112 has settled down. Determining the deviation thresholds of sensor measurements can be in real time or can occur at an earlier time. The learned thresholds 418 that were determined at an earlier time can be stored in threshold database 416 for later retrieval.

Upon generating the measurement matrices and obtaining the deviation thresholds, settlement decider 408 can determine whether user 112 has settled down (hereinafter also referred to as "user settled state"). Upon determining that user 112 has settled down, settlement decider 408 can notify action management module 422. Action management module 422 is a component of mobile device 102 configured to perform the action associated with a geofence upon receiving a notification from settlement decider 408.

Exemplary Procedures

Figure 5:
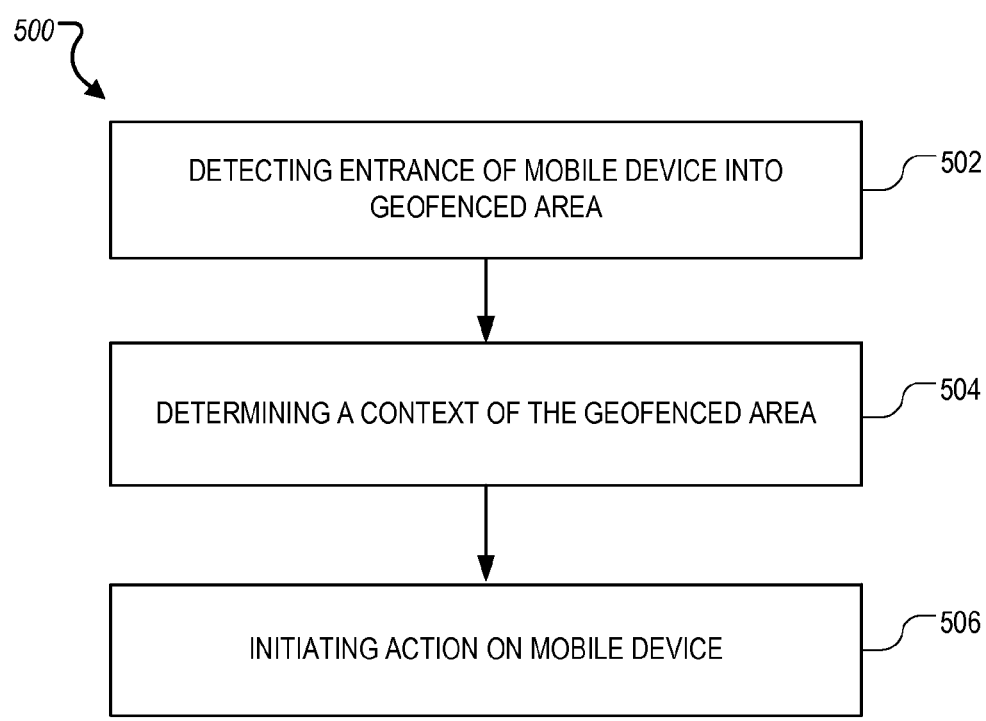
FIG. 5 is a flowchart of an example process of user settlement detection.

FIG. 5 is a flowchart of example process 500 of settlement detection. Process 500 can be performed device architecture 600, as described in reference to FIG. 6.

Mobile device 102 can detect (502) an entrance of mobile device 102 into a geofenced environment (e.g., geofenced environment 104). The geofenced environment can be associated with an action that requires interaction with a user. Mobile device 102 can be configured to perform the action after entering the geofenced environment.

In response to detecting the entrance, mobile device 102 can determine (504) a context of the geofenced environment. A context of the geofenced environment can include information additional to geographic location information (e.g., latitude and longitude) of the geofenced area. The context can include user activities, a set of environment variables or both. Determining the context can include, for example, determining that mobile device 102 is in a user settled state. The user settled state can be a state of mobile device 102 in which mobile device 102 deems a user of mobile device 102 has settled. Determining that mobile device 102 is in the user settled state can include taking multiple measurements of environment variables over time, determining variations of the measurements and comparing the variations with threshold values. The variations can include statistical variations (e.g., standard deviations or variances of RSSI), non-statistical variations (e.g., duty cycles of the access points) or both. Mobile device 102 can determine the user settled state upon determining that the variations satisfy the threshold values. The threshold values can include at least one of a sparsity threshold, a deviation threshold or a duty cycle threshold.

Determining that the variations satisfy the threshold values can include constructing a measurement matrix (e.g., measurement matrix 208 or 304) by mobile device 102. The measurement matrix can have a first dimension corresponding to the observed signal sources and a second dimension corresponding to a series of time measurements, as shown in Equation [1]. The measurement matrix can have elements representing measurements of observed signals from the signal sources at respective measurement times. In some implementations, the measurements can include measurements of wireless signals from observed signal sources. The observed signal sources can include at least one of access points of a wireless local area network or devices of a personal area network. Mobile device 102 can determine that the variations satisfy the threshold values using at least one of a sparsity threshold, a deviation threshold, or a duty cycle threshold.

Mobile device 102 can determine that the variations satisfy the threshold values upon determining that the measurement matrix has a sparsity that is less than a sparsity threshold. The sparsity of the matrix can indicate a frequency at which signal sources are observed and then lost by mobile device 102. A higher sparsity of the matrix indicates a higher frequency of signal source detection and loss. The sparsity threshold can be a pre-specified threshold value stored on mobile device 102.

Mobile device 102 can determine that the variations satisfy the threshold values upon determining that standard deviations of the measurements over the time periods are less than a deviation threshold. Determining that the standard deviations of the measurements over the time periods are less than the deviation threshold can include determining the deviation threshold in real time. Mobile device 102 can determine deviation thresholds of the observed signals at a time when one or more motion sensor readings indicate that mobile device 102 is stationary.

Mobile device 102 can determine that the variations satisfy the threshold values upon determining that duty cycles of the observed signals over the time period are greater than a duty cycle threshold. The duty cycle threshold can include a vector having a respective element corresponding to each signal source. Each element of the vector can be a respective ratio of an active time of the corresponding signal source over a sum of the time periods. Mobile device 102 can determine that the duty cycles of the observed signals satisfy the duty cycle threshold upon determining that each duty cycle is greater than a corresponding duty cycle threshold, as shown in Equation [2].

Mobile device 102 can trigger (506) the action upon detecting the context, e.g., upon detecting a user settled state. Triggering the action can include executing an application program or performing a system function. Each of executing the application program or performing the system function can cause mobile device 102 to present visual, audio or force feedback. In some implementations, a user interface is presented to allow the user to interact with mobile device 102.

Example Mobile Device Architecture

Figure 6:
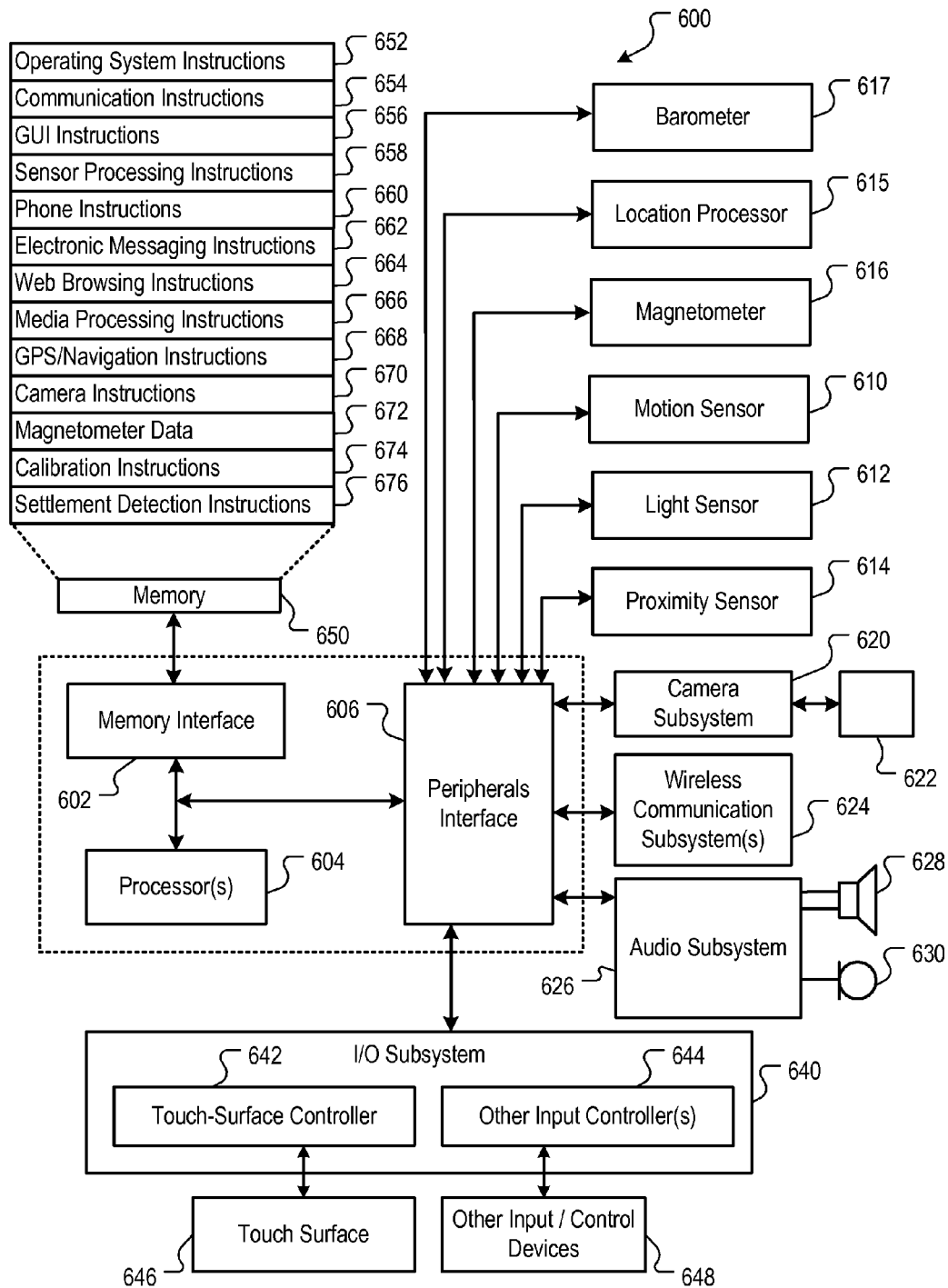
FIG. 6 is a block diagram illustrating an exemplary device architecture of a mobile device implementing the features and operations described in reference to FIGS. 1-5.

FIG. 6 is a block diagram of an exemplary architecture 600 for the mobile devices of FIGS. 1-5. A mobile device (e.g., mobile device 102) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in mobile device 102, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 102 on or off. The user may be able to customize a functionality of one or more of the buttons. The touch surface 646 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as iOS, Darwin, RTXC, LINUX, UNIX, OS X, WINDOWS, or an embedded operating system such as VxWorks. Operating system 652 may include instructions for handling basic system services and for performing hardware dependent actions. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions and/or web-shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store settlement detection instructions 676 that, when executed, can cause processor 604 to perform operations of determining whether mobile device 102 is in a user settled state after entering a geofenced environment. The operations can including the operations described in FIGS. 1-5.

Each of the above identified instructions and applications can correspond to a set of instructions for performing one or more functions described above. These instructions need not be implemented as separate software programs, procedures or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
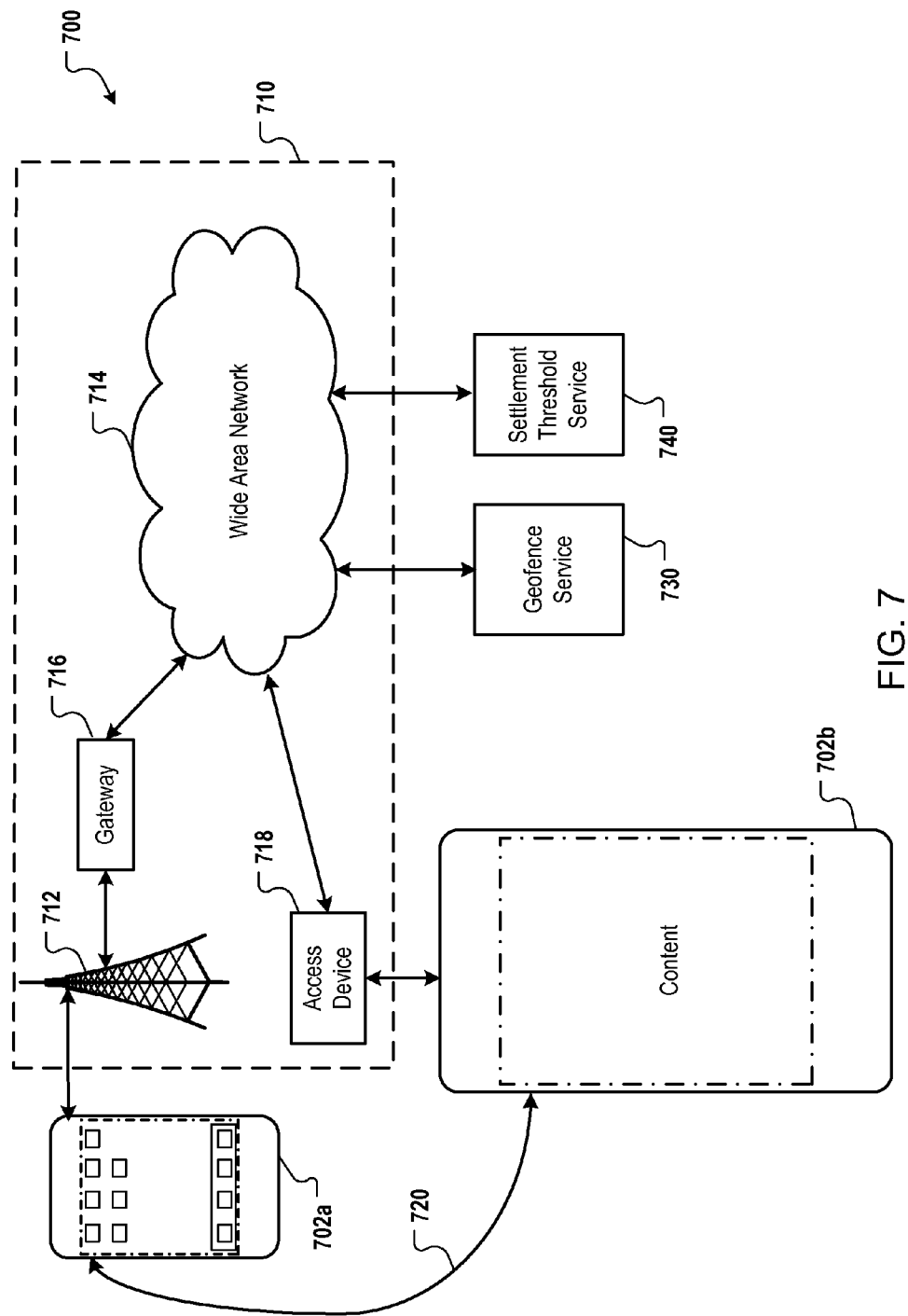
FIG. 7 is a block diagram of an exemplary network operating environment for the mobile devices of FIGS. 1-6.

FIG. 7 is a block diagram of an exemplary network operating environment 700 for the mobile devices of FIGS. 1-6. Mobile devices 702*a* and 702*b* can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g or 802.11n wireless access point, can provide communication access to the wide area network 714. Each of mobile devices 702*a* and 702*b* can be mobile device 102 as described above in reference to FIGS. 1-6.

In some implementations, both voice and data communications can be established over wireless network 712 and the access device 718. For example, mobile device 702*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702*b* can place and receive phone calls, send and receive e-mail messages, and retrieve electronic documents over the access device 718 and the wide area network 714. In some implementations, mobile device 702*a* or 702*b* can be physically connected to the access device 718 using one or more cables and the access device 718 can be a personal computer. In this configuration, mobile device 702*a* or 702*b* can be referred to as a "tethered" device.

Mobile devices 702*a* and 702*b* can also establish communications by other means. For example, wireless mobile device 702*a* can communicate with other wireless devices, e.g., other mobile devices, cell phones, etc., over the wireless network 712. Likewise, mobile devices 702*a* and 702*b* can establish peer-to-peer communications 720, e.g., a personal area network, by use of one or more communication subsystems, such as the Bluetooth™ communication devices. Other communication protocols and topologies can also be implemented.

The mobile device 702*a* or 702*b* can, for example, communicate with one or more services 730 and 740 over the one or more wired and/or wireless networks. For example, one or more geofence services 730 can allow mobile devices 702*a* and 702*b* to download and execute geofence related applications. Settlement threshold service 740 can provide information including various thresholds for detecting user settlements to the mobile devices 702*a* and 702*b*.

Mobile device 702*a* or 702*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 702*a* or 702*b*. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations of the invention have been described. Nevertheless, it will be understood that various modifications can be made without departing from the spirit and scope of the invention.

What is claimed is:

1. A method comprising:
   detecting, by a mobile device, an entrance of the mobile device into a geofenced environment, the geofenced environment being associated with an action, the mobile device being configured to perform the action upon entering the geofenced environment;
   in response to detecting the entrance, determining, by the mobile device, a context of the geofenced environment, wherein determining the context of the geofenced environment comprises:
      taking multiple measurements of one or more environment variables using one or more sensors of the mobile device,
      determining variations in the measurements,
      determining that the variations satisfy threshold values including at least one of a sparsity threshold, a deviation threshold, or a duty cycle threshold, and
      based upon the determination that the variations satisfy the threshold values, determining a user settled state indicating that a user of the mobile device is settled in the geofenced environment; and
   triggering the action by the mobile device upon determining the context of the geofenced environment.

2. The method of claim 1, wherein:
   the measurements include measurements of wireless signals from observed signal sources including at least one of access points of a wireless local area network or devices of a personal area network.

3. The method of claim 1, wherein determining that the variations satisfy the threshold values comprises:
   determining a measurement matrix having a first dimension corresponding to the observed signal sources and a second dimension corresponding to a series of measurement time periods, the measurement matrix having elements representing measurements of signals from the observed signal sources at respective measurement time periods; and
   determining that the variations satisfy the threshold values upon determining at least one of:
      that the matrix has a sparsity that is less than the sparsity threshold;
      that standard deviations of the measurements over the time periods satisfy the deviation threshold; or
      that duty cycles of the observed signal sources over the measurement time period are greater than the duty cycle threshold.

4. The method of claim 3, wherein determining that the variations satisfy the threshold values is responsive to determining that the standard deviations of the measurements over the measurement time periods satisfy the deviation threshold, wherein determining that the standard deviations of the measurements over the measurement time periods satisfy the deviation threshold comprises:
   determining the deviation threshold, including determining standard deviations of the observed signals at a time when one or more motion sensor readings indicate that the mobile device is not moving; and
   determining that the standard deviations of the observed signals over the time periods are less than the deviation threshold.

5. The method of claim 3, wherein determining that the variations satisfy the threshold values is responsive to determining that the matrix has the sparsity that is less than the sparsity threshold, wherein the sparsity of the matrix indicates a frequency at which signal sources are observed and then lost by the mobile device, and the sparsity threshold is a pre-specified threshold stored on the mobile device.

6. The method of claim 3, wherein determining that the variations satisfy the threshold values is responsive to determining that the duty cycles of the observed signal sources over the measurement time period are greater than the duty cycle threshold, wherein the duty cycle threshold comprises a vector having a respective element corresponding to each signal source, each element specifying a respective ratio of active time of the corresponding signal source over a sum of the series of time periods.

7. The method of claim 1, wherein triggering the action comprises executing an application program or performing a system function, wherein each of executing the application program or performing the system function causes the mobile device to present a user interface for the user to interact with the mobile device.

8. A system, comprising:
one or more processors; and
a non-transitory computer-readable medium storing instructions that, when executed by the one or more processors, cause the one or more processors to perform operations comprising:
detecting an entrance of a mobile device into a geofenced environment, the geofenced environment being associated with an action, the mobile device being configured to perform the action upon entering the geofenced environment;
in response to detecting the entrance, determining a context of the geofenced environment, wherein determining the context of the geofenced environment comprises:
taking multiple measurements of one or more environment variables using one or more sensors of the mobile device,
determining variations in the measurements,
determining that the variations satisfy threshold values including at least one of a sparsity threshold, a deviation threshold, or a duty cycle threshold, and
based upon the determination that the variations satisfy the threshold values, determining a user settled state indicating that a user of the mobile device is settled in the geofenced environment; and
triggering the action upon determining the context of the geofenced environment.

9. The system of claim 8, wherein:
the measurements include measurements of wireless signals from observed signal sources including at least one of access points of a wireless local area network or devices of a personal area network.

10. The system of claim 8, wherein determining that the variations satisfy the threshold values comprises:
determining a measurement matrix having a first dimension corresponding to the observed signal sources and a second dimension corresponding to a series of measurement time periods, the measurement matrix having elements representing measurements of signals from the observed signal sources at respective measurement time periods; and
determining that the variations satisfy the threshold values upon determining at least one of:
that the matrix has a sparsity that is less than the sparsity threshold;
that standard deviations of the measurements over the time periods satisfy the deviation threshold; or
that duty cycles of the observed signal sources over the measurement time period are greater than the duty cycle threshold.

11. The system of claim 10, wherein determining that the variations satisfy the threshold values is responsive to determining that the standard deviations of the measurements over the measurement time periods satisfy the deviation threshold, wherein determining that the standard deviations of the measurements over the measurement time periods satisfy the deviation threshold comprises:

determining the deviation threshold, including determining standard deviations of the observed signals at a time when one or more motion sensor readings indicate that the mobile device is not moving; and
determining that the standard deviations of the observed signals over the time periods are less than the deviation threshold.

12. The system of claim 10, wherein determining that the variations satisfy the threshold values is responsive to determining that the matrix has the sparsity that is less than the sparsity threshold, wherein the sparsity of the matrix indicates a frequency at which signal sources are observed and then lost by the mobile device, and the sparsity threshold is a pre-specified threshold stored on the mobile device.

13. The system of claim 10, wherein determining that the variations satisfy the threshold values is responsive to determining that determining that the duty cycles of the observed signal sources over the measurement time period are greater than the duty cycle threshold, wherein the duty cycle threshold comprises a vector having a respective element corresponding to each signal source, each element specifying a respective ratio of active time of the corresponding signal source over a sum of the series of time periods.

14. The system of claim 8, wherein triggering the action comprises executing an application program or performing a system function, wherein each of executing the application program or performing the system function causes the mobile device to present a user interface for the user to interact with the mobile device.

15. A non-transitory computer-readable medium storing instructions that, when executed by one or more processors, cause the one or more processors to perform operations comprising:
detecting an entrance of a mobile device into a geofenced environment, the geofenced environment being associated with an action, the mobile device being configured to perform the action upon entering the geofenced environment;
in response to detecting the entrance, determining a context of the geofenced environment, wherein determining the context of the geofenced environment comprises:
taking multiple measurements of one or more environment variables using one or more sensors of the mobile device,
determining variations in the measurements,
determining that the variations satisfy threshold values including at least one of a sparsity threshold, a deviation threshold, or a duty cycle threshold, and
based upon the determination that the variations satisfy the threshold values, determining a user settled state indicating that a user of the mobile device is settled in the geofenced environment; and
triggering the action upon determining the context of the geofenced environment.

16. The non-transitory computer-readable medium of claim 15, wherein:
the measurements include measurements of wireless signals from observed signal sources including at least one of access points of a wireless local area network or devices of a personal area network.

17. The non-transitory computer-readable medium of claim 15, wherein determining that the variations satisfy the threshold values comprises:
determining a measurement matrix having a first dimension corresponding to the observed signal sources and a second dimension corresponding to a series of measurement time periods, the measurement matrix having elements representing measurements of signals from the observed signal sources at respective measurement time periods; and determining that the variations satisfy the threshold values upon determining at least one of:
- that the matrix has a sparsity that is less than the sparsity threshold;
- that standard deviations of the measurements over the time periods satisfy the deviation threshold; or
- that duty cycles of the observed signal sources over the measurement time period are greater than the duty cycle threshold.

18. The non-transitory computer-readable medium of claim 17, wherein determining that the variations satisfy the threshold values is responsive to determining that the standard deviations of the measurements over the measurement time periods satisfy the deviation threshold, wherein determining that the standard deviations of the measurements over the measurement time periods satisfy the deviation threshold comprises:
- determining the deviation threshold, including determining standard deviations of the observed signals at a time when one or more motion sensor readings indicate that the mobile device is not moving; and
- determining that the standard deviations of the observed signals over the time periods are less than the deviation threshold.

19. The non-transitory computer-readable medium of claim 17, wherein determining that the variations satisfy the threshold values is responsive to determining that the matrix has the sparsity that is less than the sparsity threshold, wherein the sparsity of the matrix indicates a frequency at which signal sources are observed and then lost by the mobile device, and the sparsity threshold is a pre-specified threshold stored on the mobile device.

20. The non-transitory computer-readable medium of claim 17, wherein determining that the variations satisfy the threshold values is responsive to determining that determining that the duty cycles of the observed signal sources over the measurement time period are greater than the duty cycle threshold, wherein the duty cycle threshold comprises a vector having a respective element corresponding to each signal source, each element specifying a respective ratio of active time of the corresponding signal source over a sum of the series of time periods.

21. The non-transitory computer-readable medium of claim 15, wherein triggering the action comprises executing an application program or performing a system function, wherein each of executing the application program or performing the system function causes the mobile device to present a user interface for the user to interact with the mobile device.

* * * * *

UNITED STATES PATENT AND TRADEMARK OFFICE
CERTIFICATE OF CORRECTION

PATENT NO. : 9,807,561 B2  
APPLICATION NO. : 14/732635  
DATED : October 31, 2017  
INVENTOR(S) : Lukas M. Marti and Michael P. Dal Santo It is certified that error appears in the above-identified patent and that said Letters Patent is hereby corrected as shown below:

In the Claims

In Claim 6, Column 12, Lines 63-64, delete "determining that determining that" and insert -- determining that --, therefor.

In Claim 13, Column 14, Lines 16-17, delete "determining that determining that" and insert -- determining that --, therefor.

In Claim 20, Column 16, Lines 12-13, delete "determining that determining that" and insert -- determining that --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*